(12) United States Patent
Van Scyoc et al.

(10) Patent No.: US 6,354,564 B1
(45) Date of Patent: Mar. 12, 2002

(54) QUICK-DISCONNECT FLUID COUPLING WITH CHECK VALVE

(75) Inventors: Thomas W. Van Scyoc; Michael J. Suggs, both of Gastonia; Phillip G. Wilson, Mooresville, all of NC (US)

(73) Assignee: Perfecting Coupling Company, Charlotte, NC (US)

( * ) Notice: Subject to any disclaimer, the term of this patent is extended or adjusted under 35 U.S.C. 154(b) by 0 days.

(21) Appl. No.: 09/579,554

(22) Filed: May 26, 2000

Related U.S. Application Data
(60) Provisional application No. 60/138,249, filed on Jun. 9, 1999.

(51) Int. Cl.[7] ............................................... F16L 29/00
(52) U.S. Cl. ............ 251/149; 137/614.04; 137/614.05; 251/149.6
(58) Field of Search ................. 137/614.03, 614.04, 137/614.05, 614.2, 614.02, 515, 515.3, 515.7; 251/149, 149.1, 149.6

(56) References Cited

U.S. PATENT DOCUMENTS

| | | | | |
|---|---|---|---|---|
| 2,735,696 A | * | 2/1956 | Omon et al. ........... | 137/614.05 |
| 3,500,859 A | * | 3/1970 | Pearson ................. | 137/614.05 |
| 4,200,121 A | * | 4/1980 | Walter et al. .......... | 137/614.05 |
| 5,255,699 A | * | 10/1993 | Herzan et al. ...... | 137/614.05 X |

* cited by examiner

Primary Examiner—Kevin Lee
(74) Attorney, Agent, or Firm—Alston & Bird LLP

(57) ABSTRACT

A ball detent fluid coupling for liquid and gas applications has a ball-retaining sleeve on the socket that is retractable by hand for joining and for separating the socket and plug and is characterized by a pressure-actuated check valve mounted on a valve guide within the flow path to preclude backflow into the supply side of the coupling. The valve also operates to shut off the flow when the mating parts of the coupling are disconnected or when flow through the coupling is shut off. A conventional valve can be mounted in the fluid flow passageway opposite the pressure-actuated check valve to urge the mating plug and socket to decouple when the sleeve releases the ball detents from engagement with the plug and to stop flow in the discharge line. The coupling will typically be used at pressures of from about 5 to 130 psig.

7 Claims, 2 Drawing Sheets

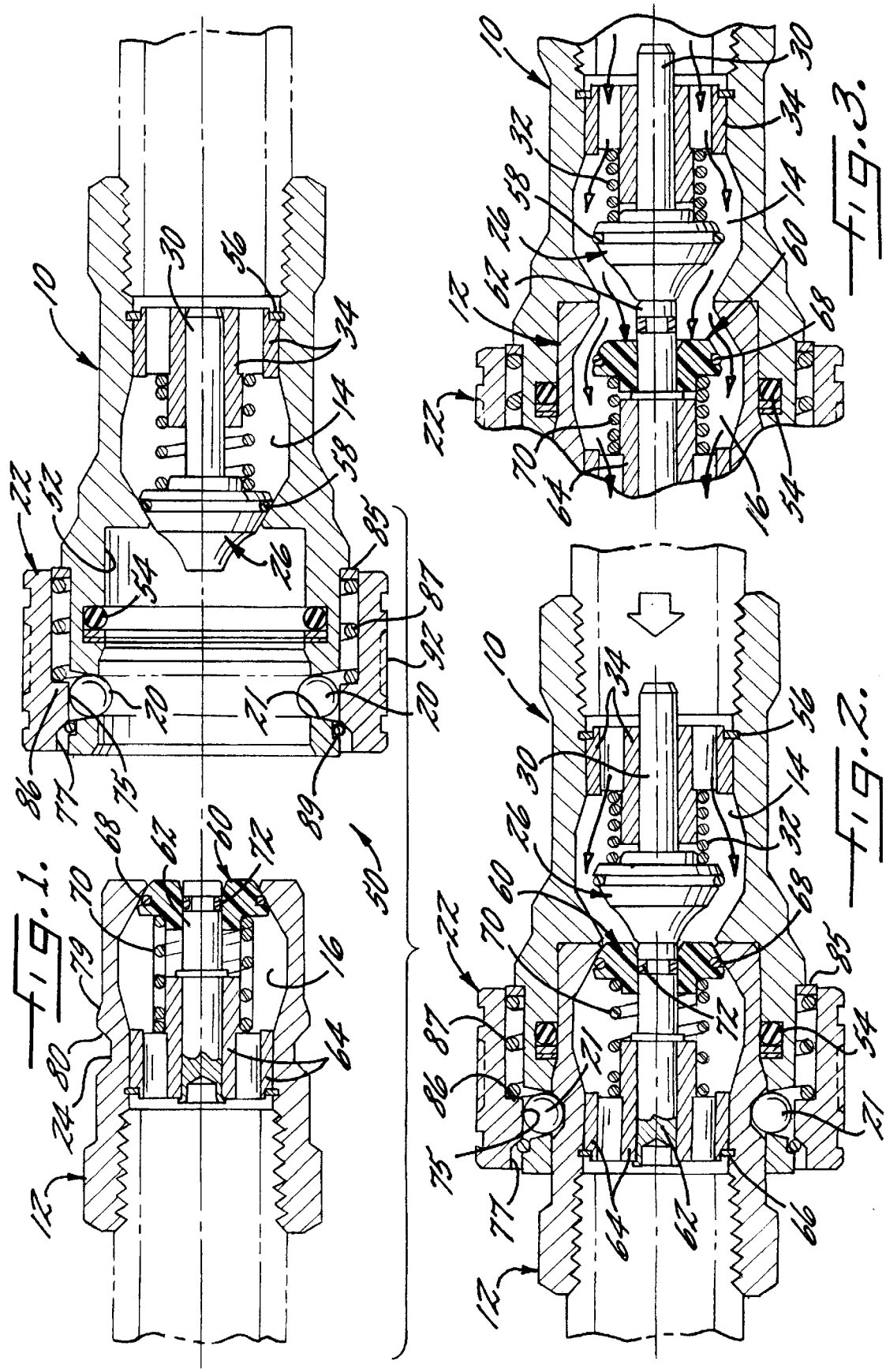

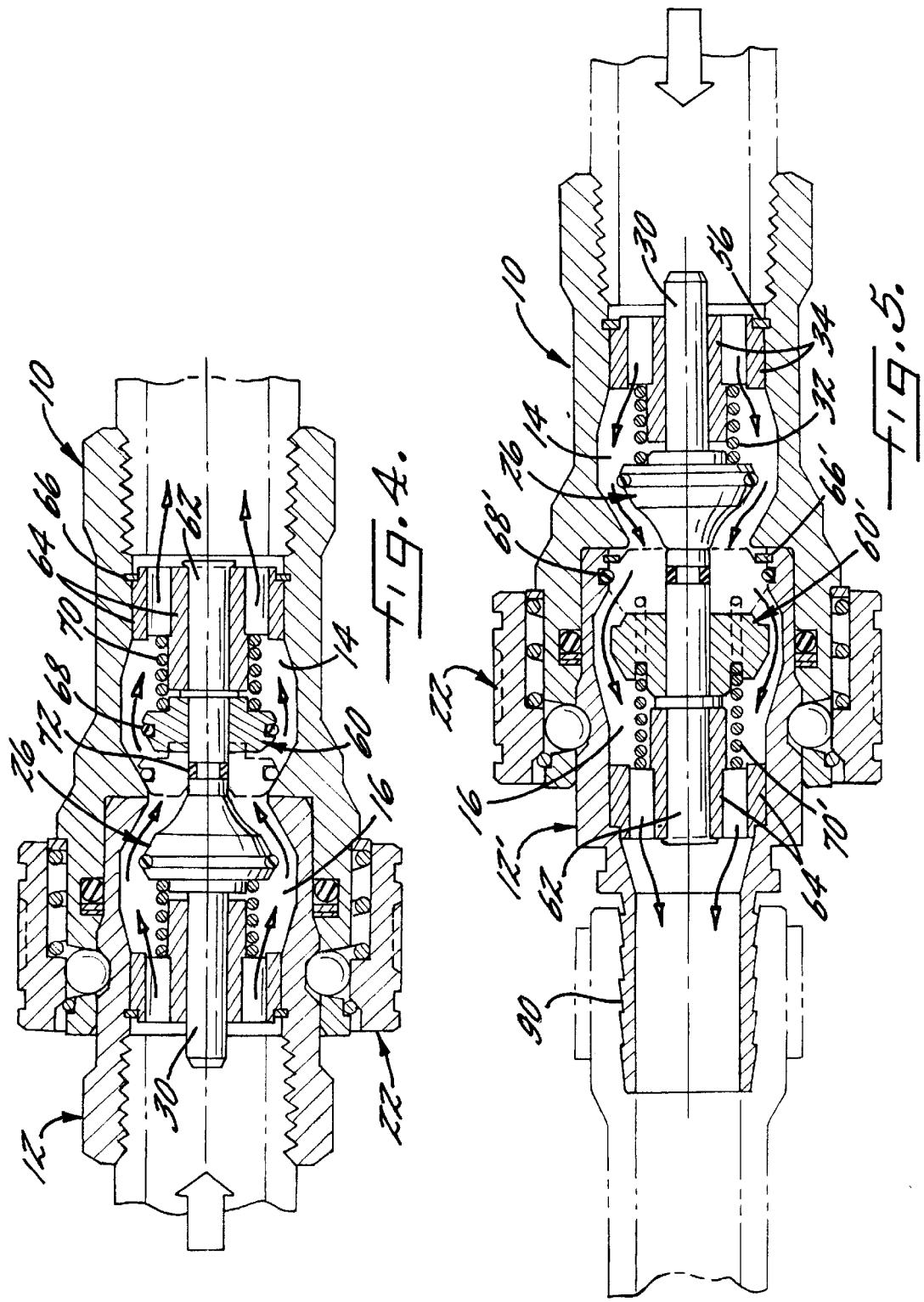

QUICK-DISCONNECT FLUID COUPLING WITH CHECK VALVE

CROSS REFERENCE TO RELATED APPLICATION

This application claims the benefit of U.S. Provisional Application No. 60/138,249, filed Jun. 9, 1999.

FIELD OF THE INVENTION

This invention relates to couplings for quickly joining or separating fluid conducting lines.

BACKGROUND OF THE INVENTION

Quick disconnect couplings are frequently used in a variety of fluid transfer systems, including both high pressure and low pressure systems and gas and liquid systems for quickly and relatively conveniently connecting and disconnecting the fluid flow supply and discharge lines. Many of these couplings are equipped with automatic means to shut off the flow of liquid when the mating parts of the quick-disconnect device are disconnected.

Quick-action couplings typically comprise two primary components, or members: a generally cylindrical socket having an axial fluid flow passage that is attached to one line and a generally cylindrical plug also having an axial fluid flow passage that is attached to the other. The plug is inserted into the socket to join the two lines and to create a single fluid flow passage between the lines. Generally speaking, the socket has a plurality of evenly spaced locking balls contained in apertures that form a circle around the plug receiving end of the socket. A spring biased detent sleeve circumscribing the socket holds the locking balls radially inwardly. To insert the plug into the socket, the operator first uses one hand to pull the detent sleeve longitudinally away from the plug receiving end of the socket so that the balls are released. Using the other hand, the operator inserts the plug into the socket. The plug has an annular groove, or race, for receiving the locking balls. The operator then releases the detent sleeve, which holds the balls in the annular groove and the plug, and secures the plug in the socket. The operator removes the plug from the socket in an analogous fashion.

Valves are typically included in the fluid flow passageway to urge the plug out of coaxial coupled relation and stop the fluid flow when the plug and socket are released from coaxial coupled relation. Conventional valves typically are fixedly mounted on a valve stem. The valve stem is mounted in a valve guide, also called a spider, that axially locates the valve stem and valve within the coupling member. A coil spring is generally mounted over the valve stem and urges on one end against the spider and on the other end against the base of the valve to urge the valve into contact with the wall of the coupling member to shut off flow. When the coupling members are joined, the valve is typically urged against the bias of the spring and away from the wall of the coupling member to provide a fluid flow passage around the valve.

However, in some fluid flow situations, it is desirable to more definitely preclude backflow of fluid into the supply line so that contamination of the supply is precluded. For example, high fructose corn syrups are frequently used in food preparation. High fructose corn syrups can be subject to contamination by the growth of various organisms, including bacteria and molds, that can effect the taste of the food product or present an unsanitary condition.

To solve this and other problems where backflow is undesirable, check valves have typically been placed in fluid flow lines. Check valves are generally placed in the line in close proximity to a fluid coupling. Check valves are unidirectional flow control devices that eliminate potential damage caused by fluid back pressure and also can assist in precluding contamination of the supply side of the line. For example, the Quick Coupling Division of the Parker Hannifin Corporation offers check valves for use in hydraulic system applications. These check valves have a unidirectional flow path that is blocked by a poppet valve. Crack pressure is set at some desirable level, such as 5 psig in a low pressure setting, to allow the check valve to perform special circuit functions or to operate under particular pressure settings. In a typical hydraulic circuit, the check valve is used to protect the pump by preventing backflow from returning to the outlet port of the pump.

It is somewhat inconvenient to mount separate quick disconnect couplings and check valves in a fluid flow line. It would be desirable to reduce the number of components that are required and the costs and complications of using multiple components to complete a flow circuit.

SUMMARY OF THE INVENTION

The invention relates to a quick disconnect fluid coupling that has an integrated check valve. A pressure-actuated check valve is included in the flow path in the coaxial coupling that precludes flow through the coupling below a specified pressure differential and that also precludes flow when the coupling members are separated from each other.

The check valve can be included in either the plug or socket portions of the coaxial coupling and is normally mounted in the downstream member of the coupling. The check valve is mounted on a valve stem axially secured by a valve guide and slides on the stem in response to the pressure of the fluid being supplied through the upstream member of the coupling. The valve will close to prevent backflow when the pressure differential across the valve drops below a predetermined amount. The valve also is closed when the members of the coupling are separated. A conventional valve can be included in the other coupling member, if desired, to open the fluid passageway in that coupling member when the coupling members are in coaxial coupled relation and to shut off flow if the coupling members are separated. The conventional valve is opened by engaging the stem upon which the check valve is mounted when the coupling members are coupled.

Thus, the invention provides a one-piece check valve/coupling combination. The single unit of the invention withstands the rigors of high flow while maintaining ease of installation. The number of components is reduced. Additional space is made available in an enclosed working environment where space issues are sometimes critical. The unitary check valve and coupling also provides for easy replacement of components and for reduced maintenance expense and effort. The check valve of the invention is useful in both liquid and gas applications and at crack pressure typically of from about 5 to 130 psig.

BRIEF DESCRIPTION OF THE DRAWINGS

FIG. 1 shows a longitudinal section of a plug and socket, coaxially aligned but separated, in accordance with one embodiment of the invention wherein a check valve is located within the plug.

FIG. 2 is a longitudinal section through the plug and socket of FIG. 1 shown in coaxial coupled relation and having the check valve shown in a closed position.

FIG. 3 is a view similar to FIG. 2, but showing the check valve in an open position.

FIG. 4 shows a longitudinal section through a plug and socket in accordance with another embodiment of the invention in coaxial coupled relation and having a check valve located within the socket, which is shown in both open and closed positions.

FIG. 5 shows a longitudinal section through plug and socket members, in coaxial coupled relation, in accordance with a still further embodiment of the invention having a check valve of a different construction from that of the embodiment of FIG. 1 mounted in the plug.

DETAILED DESCRIPTION OF THE INVENTION

The invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 shows a coupling of the invention designated generally at 50 and having a first member shown as a socket 10 and a second member shown as a mating plug 12 positioned for insertion into the socket. The socket and plug are coupled as shown in FIG. 2 to form an internal fluid flow passage between the plug and the socket and the lines that are attached thereto. The socket includes a counterbore 52 for receiving the mating plug. A seal 54 is carried in the counterbore to engage the plug on insertion of the plug into the socket substantially to preclude fluid leakage from the flow passage when the plug and socket are coupled.

The plug and socket are connected in coupled relation by a plurality of ball detents 20 in ball-retaining apertures 21 along the circumference of the socket. The ball-retaining apertures are tapered toward the flow passage so that the balls are movable radially inwardly to the limit of the taper and are freely movable radially outwardly with respect to the plug.

The plug includes a race 24 for receiving the locking balls. A detent sleeve 22 circumscribes the socket and holds the balls in the race of the plug for maintaining the plug and socket in coupled relation, and is movable axially for releasing the balls from the plug to disconnect the plug and socket. The sleeve has a projecting shoulder 75 that is shown in FIG. 2 in registry with the ball-retaining apertures and holding the balls in engagement with the annular race 24 on the plug when the plug and socket are fixed in coaxial coupled relation. Adjacent the projecting shoulder, the sleeve has an annular groove 77 for receiving the balls while the plug is inserted into or removed from the socket. An annular shoulder 79 is also provided on the plug to urge the balls radially outwardly into the annular groove on the socket. The balls then drop into the race on the plug where they are held in place until the plug is disconnected from the socket. A first annular ramp 80 forms one of the sidewalls of the annular groove for engaging the balls and urging them radially outwardly when the plug is removed from the socket.

A washer 85 on the socket and a flange 86 on the sleeve form the end points of a passage between the socket and sleeve. The passage contains a helical compression spring 87 that biases the sleeve against the snap ring toward the plug receiving end of the socket so that when the plug and socket are disconnected the annular groove in the sleeve is held in registry with the ball-retaining apertures. The sleeve is limited in further longitudinal movement in the direction of the plug-receiving end of the socket by a snap ring 89.

The socket and plug are disconnected by retracting the sleeve on the socket by longitudinally moving the sleeve on the socket against the bias of the spring and toward the end of the socket away from the plug. A knurled or grooved surface 92 is provided on the sleeve to facilitate grasping the sleeve. The projecting shoulder on the sleeve moves out of engagement with the balls and the ball-retaining apertures and opens a passageway 77 radially outward of the ball-retaining apertures into which the balls are received when the plug is pulled outwardly from the socket, thereby releasing the plug from the socket.

The flow passage 14 of the socket contains a conventional valve 26 that is biased to close the flow passage in the socket when the fittings are disconnected. The valve sits on a stem 30 that is carried by a spider, or valve guide, 34. The spider is fixed in the socket by a snap ring 56. An O-ring washer 58 around the large diameter portion of the valve engages the side wall of the socket to prevent fluid leakage when the plug is disconnected from the socket. A stem spring 32 biases the valve and causes the O-ring to engage the side wall in the socket to seal the fluid flow passageway.

The mating plug 12 has a valve 60, a valve stem 62, a spider 64, a snap ring 66, an O-ring washer 68, and a spring 70 that substantially prevent fluid leakage from the plug when the plug and socket are disconnected. The valve stem 62 in the plug urges the valve 26 in the socket against the bias of the springs 32 to open the flow passageway in the socket when the plug and socket are coupled (FIG. 2).

However, as shown in FIGS. 1 and 2, the valve mounted in the plug is mounted on the valve stem for sliding between open and closed positions in response to the pressure of the fluid in the coupling, there being no structure of the socket that urges the plug valve into the open position when the plug and socket are coupled. An O-ring 72 is included in a circumferential groove about the valve stem 62 to provide a seal between the valve stem and the valve body 60 so that when the valve body moves on the valve stem, leakage between the valve stem and valve body is precluded. The spring 70 surrounding the valve stem has a suitable spring constant so that the valve will open at a desired fluid pressure differential and will close if fluid pressure differential is below that amount. Thus, the valve does not remain in the open position until the coupling is disconnected, but closes whenever fluid flow through the coupling is stopped or is below some set amount or when the coupling is disconnected. For low-pressure applications, including high fructose corn syrup addition to processed food products, the crack pressure will typically be about 5 psig. Crack pressures may be as high or low as required for a specific application and will typically vary from about 5 to 130 psig. As should be apparent to the skilled artisan, the body size of the coupling and size of the threads used to attach the coupling to a flow line is to be coordinated for a particular flow rate and crack pressure. Special seals may be required for high temperatures or hostile gases or liquids, including, for example EPDM seals, which are made from a terpolymer elastomer of ethylene-propylene diene monomer.

The valve body 60 can be made of any suitable material. In low pressure fluid applications, and in particular for food grade applications, polytetrafluoroethylene valve bodies have been determined to be particularly useful. PTFE typically is inert to most food products and is generally accepted in the food industry. One common brand of PTFE is Teflon, which is available from the DuPont Company.

FIG. 4 depicts an alternative embodiment of the invention similar to that of FIGS. 1–3, but having the check valve of the invention mounted in the socket rather than in the plug. The operation of the check valve in the socket and the valve in the plug is analogous to that of FIGS. 1–3, but fluid flow is in the opposite direction.

FIG. 5 shows a still further alternative embodiment of the invention in which the check valve is mounted in the plug. However, the O-ring 68' for sealing the check valve 60' against the inside wall of the plug is mounted in a circumferential groove in the inside wall of the plug adjacent a snap ring 66' rather than being mounted on the periphery of the valve 60'. The plug shown in FIG. 5 has the end away from the coupling end formed as a barbed adapter 90 for insertion and securing within a hose, typically using hose clamps.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A quick-action fluid coupling for fluid conducting lines, said coupling comprising:

a generally cylindrical first member having an axial fluid flow passageway therethrough and a coupling end portion;

a generally cylindrical second member having a coupling end portion that is engageable with said coupling end portion of said first member for coaxial coupled relation between said first and second members, said second member having a corresponding axial fluid flow passage therethrough so that when said coupling end portion of said second member is coupled with said coupling end portion of said first member, a single fluid flow passage is defined through said first and second member;

means for releasably securing said first and second members in coaxial coupled relation for the flow of fluid therethrough; and a valve mounted in the fluid flow passageway of one of said first and second members and operable to close said fluid flow passageway when fluid pressure differential across the valve drops below a predetermined level, said valve comprising a valve body mounted on a valve stem axially secured in said coupling member by a valve guide, said valve body being mounted for axially slidable movement on said stem in response to fluid pressure.

2. The coupling of claim 1 wherein said valve stem includes an O-ring mounted in a circumferential groove on the valve stem for precluding leakage between the valve stem and the valve body.

3. The coupling of claim 1 wherein said valve body is made of polytetrafluoroethylene.

4. The coupling of claim 1 wherein said valve is responsive to open the fluid flow passageway when the fluid pressure differential exceeds 5 psig.

5. A socket component for a quick-disconnect fluid coupling for fluid conducting lines, the coupling having a generally cylindrical mating plug defining a coupling end portion for being received in said socket, the plug having an axial fluid flow passage therethrough, a first annular ramp for urging ball detents radially outwardly when the plug is being inserted into said socket, and a race circumscribing the plug that is engaged by the ball detents to secure the plug in coaxial coupled relation with said socket, one side wall of the race being defined by a second annular ramp that is adjacent the first annular ramp and is of opposite slope, the second annular ramp urging the ball detents radially outwardly when the plug is withdrawn from said socket, wherein said socket component comprises:

a generally cylindrical socket having an axial fluid flow passage therethrough and a coupling end portion for receiving the corresponding mating plug so that when said socket and the mating plug are joined in coaxial coupled relation, a single fluid flow passage is defined through the plug and said socket;

a plurality of ball detents retained in ball-retaining apertures defined by said socket for securing the mating plug in coaxial coupled relation with said socket;

a slidable ball-retaining sleeve circumscribing said coupling end portion of said socket for releasably securing said ball detents in engagement with said race on said plug, said sleeve having a shoulder projecting radially inwardly and having an inclined surface for engaging said ball detents in a radially inward position, said shoulder defining on one side thereof between said sleeve and said socket a first annular passage into which said ball detents are received in a radially outward position in response to said first and second annular ramps on said plug when said plug is respectively inserted into and removed from said socket, said shoulder defining on the other side thereof between said sleeve and said socket a second annular passage;

a helical compression spring circumscribing said socket and located in said second annular passage normally longitudinally urging said ball-retaining sleeve to maintain said ball detents in a radially inward position, said ball-retaining sleeve being retractable in opposition to said helical compression spring to release said ball detents, and said inclined surface of said inwardly projecting shoulder being urged by a predetermined separating force applied to at least one of said socket and plug in opposition to said spring to release said ball detents when said ball detents are urged radially outwardly by said first and second ramps on said plug, whereby said plug is released from secured coaxial coupled relation; and a pressure-actuated valve body slidably mounted upon a valve stem axially secured by a valve guide in the fluid flow passage of said socket and having a valve spring associated therewith for urging said valve body to close said fluid flow passage, said valve body being movable on said valve stem in response to fluid pressure to open said fluid passageway.

6. A plug component for a quick-disconnect fluid coupling for fluid conducting lines, the coupling having a generally cylindrical mating socket defining a coupling end portion for receiving said plug, the socket having an axial fluid flow passage therethrough, a plurality of ball detents retained in ball-retaining apertures defined by said socket for securing the mating plug in coaxial coupled relation with said socket, a slidable ball-retaining sleeve circumscribing said coupling end portion of said socket for releasably securing said ball detents in engagement with said plug, and a helical compression spring circumscribing said socket and located between said sleeve and said coupling end portion of said socket for normally longitudinally urging said ball-retaining sleeve to maintain said ball detents in a radially inward position, said sleeve being retractable in opposition to said helical compression spring to release said ball detents when the plug is withdrawn from the socket, wherein said plug component comprises:

- a generally cylindrical plug having a fluid flow passage therethrough and a coupling end portion that is couplable with said coupling end of said mating socket for coaxial coupled relation between said socket and said plug, so that when said plug is received in said socket, a single fluid flow passage is defined through said coupling;
- a first annular ramp on said plug for urging said ball detents radially outwardly when said plug is being inserted into said socket;
- a race circumscribing said plug that is engaged by said ball detents to secure said plug in coaxial coupled relation with said socket; one sidewall of said race being defined by a second annular ramp that is adjacent said first annular ramp and is of opposite slope, said second annular ramp urging said ball detents radially outwardly when said plug is withdrawn from said socket; and
- a pressure-actuated valve body slidably mounted upon a valve stem axially secured by a valve guide in the fluid flow passage of said plug and having a valve spring associated therewith for urging said valve body to close said fluid flow passage, said valve body being movable on said valve stem in response to fluid pressure to open said fluid passageway.

7. The plug of claim 6 wherein the valve stem does not extend beyond the coupling end of said plug.

* * * * *